United States Patent Office 2,875,317
Patented Feb. 24, 1959

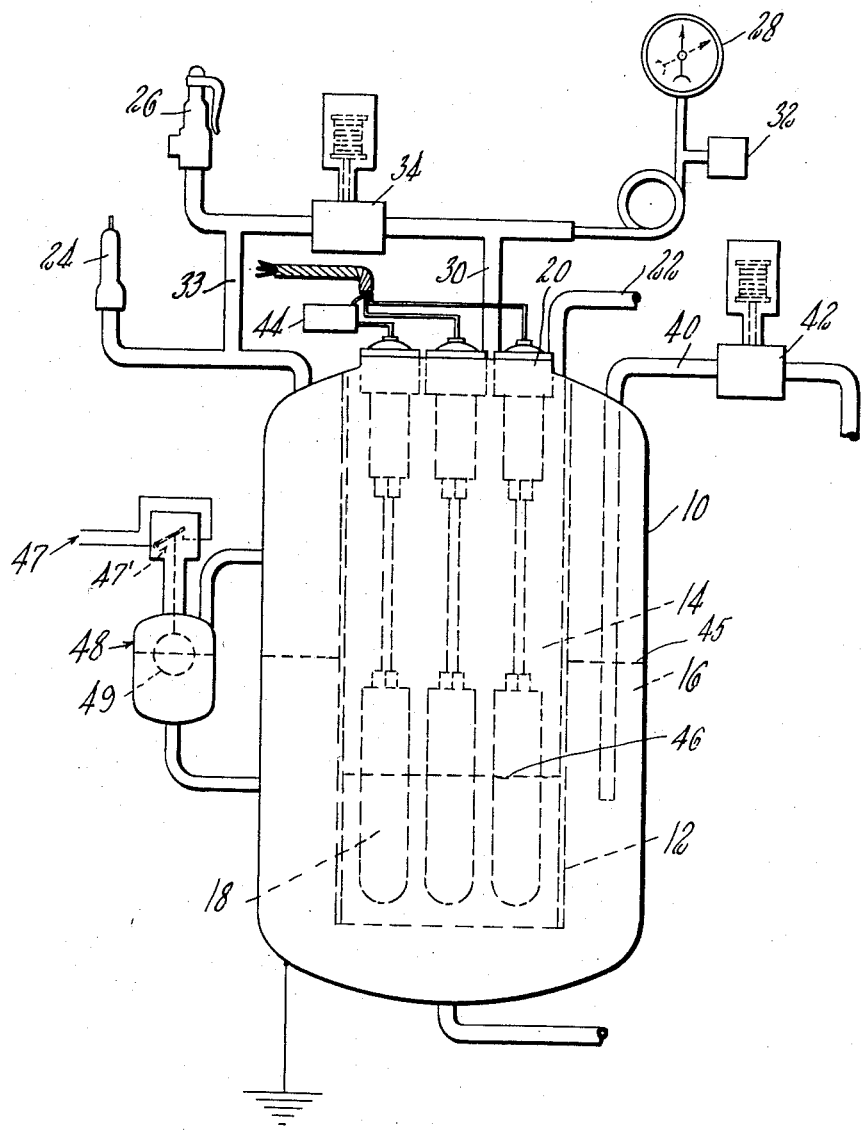

2,875,317

REGULATING CONTROL FOR IMMERSED ELECTRODE BOILER

Don S. Strader, East Greenwich, R. I., assignor to Pantex Manufacturing Corporation, Central Falls, R. I., a corporation of Rhode Island Application July 5, 1957, Serial No. 670,205

3 Claims. (Cl. 219—40)

This invention relates to steam generators of the immersed electrode type and more particularly to the association therewith of novel controls for improving their operating characteristics.

Heretofore, it has been conventional to provide such steam generators with a water level regulating chamber to and from which the conductive water in which the electrodes are immersed can flow and thus regulate the steam output according to the load demand by automatic determination of the area of the electrodes that remain immersed in the conductive water or other liquid.

For this purpose, a line is provided running from the top of the electrode chamber to the top of the regulating chamber and, interposed in this line, is a spring-actuated pressure reducing valve whose function, in effect, is to adjust the cross-sectional area of the line so that, when the pressure in the electrode chamber exceeds a certain amount, the pipe area will be decreased. This causes the water level in the electrode chamber to be lowered, reducing the current input, which is proportional to the immersed area of the electrodes, and reducing the rate of steam generation until the pressure drops to a point where the pressure-regulating valve moves to increase the pipe area, whereupon the water will return from the regulating chamber into the electrode chamber.

In cases of constant load, this type of pressure regulating valve tends to hunt for and finally remain in a throttled position so that the pressures in the electrode chamber and the regulating chamber become equalized and the water levels in the chambers tend to remain constant, being replenished by an automatic water feed to replace water lost by consumption.

Such operation at constant water level over the electrodes is efficient for short operating periods. However, during constant operation for long periods of time constant water level operation has decided disadvantages. Superior electrode life and better efficiency has been found to result by deliberately operating an immersed electrode boiler with constantly changing or surging water levels. In particular, this results in avoiding constant operation utilizing only the tips of the electrodes and thus the area of wear is not confined to the tips alone. Moreover, the water is constantly stirred up to maintain better electric conductivity than results from operation in a quiescent body of liquid. Further, the surging action tends to bathe the upper portions of the electrodes and prevent accumulation of deposits.

Generators in accordance with this invention utilize, instead of a throttling pressure regulating valve, a positive two-position open and close valve preferably solenoid-operated from a pressure switch. Because, however, of the inability of such a valve to maintain a throttled intermediate position and the slight lag in actuation of such a valve after a pressure for which the switch has been set has been reached, substantial surges of the conductive liquid will take place in the boiler. For example, when the solenoid valve moves to its open position, the water level in the electrode chamber rises very quickly with a surge. The inertia of the moving water causes it to rise so far in the electrode chamber as to cover so much of the electrodes as to cause a current input surge which can overload and burn out the electrodes. It is hence essential to the use of a positive open-close valve in the regulating line to guard against the danger of current input overloading.

In accordance with this invention use of such a positive open-close valve, with its attendant advantages as above set forth has been made feasible by overcoming its disadvantages of possibly dangerous overload by supplementing such a positive open-close regulating line control with an effective current input restrictor that limits to a maximum the current input during the conductive liquid surges in the electrode chamber concomitant to opening of the regulating valve.

Thus, with constant demand, the electric input will, unlike boilers controlled with throttling pressure reducing valves, vary, but will never exceed the current input for which the restrictor is set.

A typical embodiment of the invention is shown in the accompanying drawing, including certain conventional parts. Thus the boiler comprises a casing 10 which is compartmentalized internally by a cylindrical partition 12 dividing the boiler into a central electrode chamber 14 surrounded by an annular regulating chamber 16 connecting with each other at the bottom of the boiler. Three electrodes 18 are shown suspended in the electrode chamber 14 through suitable insulated fittings 20.

A steam output line from electrode chamber 14 is shown at 22, an air eliminator at 24, a safety valve at 26, and a pressure gauge at 28.

The line 30 running from the top of the electrode chamber 14 to the pressure gauge 28 has interposed therein a pressure sensitive normally closed switch 32 which is set to open when the pressure reaches a maximum value for which the switch 32 is set, for example, 90 lbs. The switch 32 is in series with a normally closed solenoid operated valve 34 interposed between the line 30 and a line 33 communicating with the regulating chamber 16.

Thus, when the boiler is started the water level in the two chambers 14 and 16 will be the same, switch 32 will be closed, energizing the coil in valve 34 to open valve 34. When, however, the pressure in line 30 as indicated by gauge 28 has built up to a predetermined point, switch 32 will open breaking the circuit to valve 34 which will close. Thereafter, any further build up of pressure in the electrode chamber 14 tends to force the water downwardly with a corresponding increase in the water level in the regulating chamber 16, for example, to the respective levels 45 and 46. The area of electrodes 18 remaining immersed in the water being decreased, generation of steam becomes insufficient to supply the demand. So, when the pressure drops below the set value for which switch 32 is set, switch 32 closes and valve 34 positively opens to full open position, thus bringing the upper parts of both chambers 14 and 16 into communication so that the water levels in those chambers will tend to equalize, thus increasing the area of electrode immersion drawing a larger quantity of current, increasing the steam generation and thus bringing the boiler pressure back to the point where switch 32 will de-energize the coil of normally closed valve 34 once again. In practical operation, then, valve 34 periodically opens and closes with the result that periodically upon each opening of valve 34 there is sudden surge of the water level in chamber 14.

Line 40 extends into the regulating chamber 16 and operates as a water bleeder. Normally, line 40 is closed by a normally closed solenoid valve 42 but the solenoid of valve 42 is connected to a relay 44 interposed in one of the leads to the electrodes.

This relay can be set to be energized at a maximum set amperage so that normally closed valve 42 is opened whenever the maximum current input exceeds the amount for which the relay 44 is set. When valve 42 opens, water is rapidly discharged from the boiler regulating chamber with the result that the water level in the electrode chamber 14 is almost instantaneously lowered to immediately decrease the electrode area which is immersed and thus cut down the current to a point below that for which the relay 44 is set whereupon valve 42 closes to prevent further discharge of water.

In operation, therefore, after the boiler has been filled with conductive water to a suitable level, the electric current is turned on and pressure builds up with valve 34 open until the switch 32 closes the valve 34 whereupon the water level in the electrode chamber 14 commences to drop and continues to drop until the pressure as registered on the gauge 28 falls below that for which the switch 32 is set; whereupon valve 34 will reopen and the water will surge back upwardly in the chamber 14, thus covering more of the electrodes and increasing the rate of steam output to build up the pressure again.

Meanwhile, if, during the upward surge of water in chamber 14, the current input to the electrodes reaches that for which the relay 44 is set as it usually does, the water level is immediately dropped by discharge of liquid through bleeder valve 42. Liquid so discharged is subsequently replaced through a source of supply of fresh water through a conventional liquid level electric switch 47', having leads 47 running to a pump (not shown). Switch 47' is operated by a float 49 positioned in a chamber 48. This periodic addition of fresh water has a particular advantage over long periods of operation because it reduces the accumulation of impurities in the boiler liquid which tend to increase the conductivity of the water. In other words, small portions of water with its ever-concentrating impurities are periodically replaced with fresh water containing less impurities, thereby maintaining a more desirable and less conductivity of the boiler water.

In this manner there is, during operation, a constant upward or downward motion of the water in the chamber 14 with the upward motion being a surge, accomplishing the objectives previously set forth and in contrast to the quiescent water level operation under constant load provided in prior art boilers. The peak current input of limited duration, with only small water loss, has also been found to aid in securing, with constant load, a substantially constant operating pressure.

I claim:

1. In a closed immersed electrode boiler having a steam output line, an electrode chamber, and a regulating chamber into which the operating liquid backs as pressure rises in the electrode chamber in order to lessen the area of the electrodes immersed in said liquid, a control system comprising a positive two-position open-close valve interposed in a line connecting said electrode and regulating chambers, means for moving said valve selectively to open or closed position including pressure sensitive actuating means to cause said valve to move from open to closed position whenever the pressure in said electrode chamber reaches a maximum for which said means is set and back to open position whenever the pressure in said output line drops below said maximum, a liquid exhaust line leading from the regulating chamber, a valve in said exhaust line and control means interposed in the electrical circuit leading to at least one of said electrodes for operating said exhaust line valve to open said exhaust line valve whenever the current exceeds a maximum current for which said control means is set as the result of upward surges of the water level in said electrode chamber responsive to movement of said first-named valve from open to closed position, and to close said exhaust line valve again whenever the current drops back below said maximum current.

2. An electrode boiler as claimed in claim 1 wherein the control means interposed in said electrical circuit comprises a current sensitive relay and said exhaust line valve is a solenoid valve operated by said relay.

3. An electrode boiler as claimed in claim 1 wherein the first-named valve is a solenoid valve and said actuating means is electrically connected to the solenoid of said valve.

References Cited in the file of this patent

UNITED STATES PATENTS

| | | |
|---|---|---|
| 2,611,852 | Eaton | Sept. 23, 1952 |
| 2,612,592 | Paulison et al. | Sept. 30, 1952 |
| 2,783,356 | Eaton | Feb. 26, 1957 |